United States Patent [19]

Stain, Jr. et al.

[11] 3,857,813

[45] Dec. 31, 1974

[54] INCORPORATION OF REINFORCING FIBERS INTO OLEFIN POLYMERS

[75] Inventors: S. Douglas Stain, Jr.; Gordon Y. T. Liu, both of Baton Rouge; Lloyd B. Hutchinson, Denham Springs, all of La.

[73] Assignee: The Dow Chemical Company, Midland, Mich.

[22] Filed: Sept. 21, 1973

[21] Appl. No.: 399,780

Related U.S. Application Data

[63] Continuation of Ser. No. 196,193, Nov. 5, 1971, abandoned.

[52] U.S. Cl.......... 260/42.18, 260/42.14, 260/42.15, 260/42.22, 260/42.46, 264/331

[51] Int. Cl. .......... C08f 45/10

[58] Field of Search.......... 260/41 AG, 41 R, 42.18, 260/42.22, 42.46

[56] References Cited

FOREIGN PATENTS OR APPLICATIONS

| | | | |
|---|---|---|---|
| 230,480 | 9/1960 | Australia | 260/41 R |
| 1,010,043 | 11/1965 | Great Britain | 260/41 R |

*Primary Examiner*—Allan Lieberman
*Assistant Examiner*—J. H. Derrington
*Attorney, Agent, or Firm*—R. G. Waterman; M. S. Jenkins

[57] ABSTRACT

Reinforcing fibers are incorporated into olefin polymers such as polyethylene by blending the fibers with the polyethylene in the form of a high bulk density, extrudable powder in which the particles possess a high degree of porosity. Thus prepared, the blends are ready for fabrication into reinforced shaped articles.

7 Claims, No Drawings

INCORPORATION OF REINFORCING FIBERS INTO OLEFIN POLYMERS

CROSS-REFERENCE TO RELATED APPLICATION

This invention is a continuation of application Ser. No. 196,193 filed Nov. 5, 1971 now abandoned.

BACKGROUND OF THE INVENTION

This invention relates to a method for incorporating reinforcing fibers into normally solid olefin polymers and reinforcing fiber-olefin polymer blends provided thereby.

In the production of fiber reinforced polyolefin articles, such as glass fiber reinforced articles, it has been the practice in the art to combine the reinforcing fibers with heat plastified polymer in order to intimately mix and coat or encase the fibers in the plastic polymer. The product containing the encapsulated glass fibers or chopped strands substantially uniformly distributed throughout is cooled and ground or cut to granular form suitable for molding. The resulting product can readily be shaped by various molding techniques, e.g., injection molding, to form articles of uniform and desired quality.

Recently, e.g. U.S. Pat. No. 3,396,142, it has been shown that glass fibers can be blended with polymers such as polystyrene, polyethylene and the like in the form of granules of a size not appreciably greater than 12 mesh (about 1,500 microns), preferably not greater than 16 mesh (about 1,200 microns). The resulting blends can then be injection molded to form the desired article. However, the blends disclosed therein sometimes segregate into glass portions and polymer portions upon shaking or otherwise conveying the blend from one place to another. Thus polymer articles having the desired uniform distribution of glass fiber in polymer are often somewhat difficult to make by practicing this technique.

In view of the foregoing, it would be highly desirable to provide an improved method for incorporating reinforcing fibers into olefin polymers.

SUMMARY OF THE INVENTION

The present invention is, in one aspect, such an improved method which comprises blending a reinforcing amount of a reinforcing fiber with an extrudable olefin polymer powder characterized by a bulk density in the range of from about 20 to about 35 pounds per cubic foot, particles having particle sizes predominantly in the range from about 50 to about 800 microns, and average free volume within individual particles in the range of from about 20 to about 50 volume percent based on total volume of the particles of the powder. Practice of this method enables the incorporation of desired amounts of reinforcing fibers into the olefin polymer and subsequent handling of the resultant blend without appreciable segregation of reinforcing fibers from the polymer.

In another aspect, the present invention is a powder blend comprising an olefin polymer in the form of powder as hereinbefore described and a reinforcing amount of reinforcing fibers.

The novel reinforcing fiber-powder blends are unique in that they can be extruded or otherwise fabricated in a single step operation into the desired shaped article. Alternatively, such powder blends can be combined as concentrates with virgin olefin polymer in any extrudable form and fabricated in a single step operation into an article having a lower degree of fiber reinforcement. Such powder blends are also unique in that they can be sujected to shaking and other movement common to the transportation of polymer blends from one place to another and without appreciable separation of reinforcing fiber from polymer.

The novel powder blends are useful in the production of fiber reinforced shaped articles of olefin polymers by any technique suitable for fabricating such olefin polymers.

DESCRIPTION OF PREFERRED EMBODIMENTS

The term "olefin polymer" means polymers of olefins in which the backbone chain of the polymer macromolecule is substantially non-crosslinked and non-branched and includes polymers of the ethylene, propylene, butene-1 and higher 1-alkenes having 5 to 10 carbon atoms in which polymer the linear main chain has substituent ethylene monomer. As used herein, the term "olefin polymers" is also meant to include homopolymers, copolymers and interpolymers of 1-alkenes, and mixtures and blends thereof. The molecular weights of olefin polymers used in the practice of this invention are comparable to those of olefin polymers produced in conventional Ziegler-Natta polymerization processes, e.g., from about 30,000 up to about 3 million or more.

For purposes of this invention, the term "polyethylene" is used to denote preferred olefin polymers and means homopolymers of ethylene and copolymers of ethylene and up to about 5 weight percent of aliphatic, hydrocarbon β-monoolefin such as propylene-1 and butene-1. Such polyethylenes have absolute densities in the range from about 0.90 to about 0.97 g/cc, especially from about 0.950 to about 0.967 g/cc, and melt indexes as determined by ASTM D-1238-65T(E) in the range from about 0.01 to about 40 decigrams/minute, especially from about 0.1 to about 10 decigrams/minute.

The polyolefins employed in the practice of this invention are in the form of normally extrudable, free flowing powder having a bulk density in the range from about 20 to about 35 pounds/cubic foot, preferably from about 25 to about 32 pounds/cubic foot. The particles of such powder are free flowing, porous particles having individual sizes within the range from about 50 to about 800 microns, preferably from about 300 to about 600 microns and generally roughened surfaces resulting from their agglomerate-like structure. Uniquely, the particles of this powder have substantial open or free space within the particles themselves. On the average, as much as about 50 volume percent and as little as about 20 volume percent based on total particle volume is free or open space occurring as pockets within the particles and as pores or openings on the particle surfaces. Preferred polyethylene powders have flowability measured as angle of repose in the range of from about 24° to about 28° and an open space (or free volume) within individual particles in the range of from about 25 to about 45 volume percent based on total particle volume. Screen analysis of especially preferred polyethylene powders indicates a particle size distribution in weight percent of total powder at the designated particle size as follows:

1.6–14.3% greater than 540 microns 72.3–87.6% from about 320 to about 540 microns 4.7–20.1% from about 248 to about 320 microns
0.8–3.3% from about 175 to about 248 microns
0.1–0.6% from about 147 to about 175 microns
0.2–1.2% less than about 147 microns.

Especially preferred powders also have surface areas in the range from about 2 to 4 square meters/gram.

The olefin polymer powders are preferably made by a low pressure polymerization process carried out in the presence of a special titanium-containing catalyst at slurry polymerization temperatures. More specifically, these high bulk density powders are preferably provided by polymerizing ethylene under low pressures e.g., from about 5 to about 30 atmospheres, and slurry polymerization temperatures, e.g., from about 0° to about 100°C, in the presence of trialkyl aluminum and a titanium containing component which has been prepared from titanium tetrachloride and diethyl aluminum monochloride. In preparation of the special titanium-containing catalyst, titanium tetrachloride dissolved in an inert hydrocarbon solvent is reacted using thorough stirring with diethyl aluminum monochloride also dissolved in inert hydrocarbon solvent in a manner such that the molar ratio of titanium tetrachloride to diethyl aluminum monochloride is at anytime prior to reaction of all titanium tetrachloride at least 1; the reaction product is then washed with inert hydrocarbon solvent and filtered to remove hydrocarbon-solvent-soluble impurities; and the washed reaction product is activated by adding trialkyl aluminum in amount such that the molar ratio of trialkyl aluminum and titanium-containing reaction product is from about 0.3:1 to about 3:1 in the resulting catalyst.

It is understood, however, that other processes capable of producing high bulk density olefin polymer powders having the aforementioned properties are also suitably employed in the practice of this invention.

Reinforcing fibers beneficially employed in the practice of this invention are fibrous materials having fiber lengths of from about one thirty-second to about 1 inch preferably from about one-fourth to about one-half inch, and diameters from about 5 to about 50 microns, preferably from about 10 to about 20 microns. Suitable reinforcing fibrous materials comprise glass, metal, asbestos, and other materials which retain their physical integrity at temperatures sufficient to heat plastify the olefin polymer. Preferred fibrous materials comprise glass with especially preferred being glass fibers of low alkali content, e.g., borosilicate glass fibers, which have been pretreated with materials known to promote adhesion between glass and organic materials, e.g., vinyl halosilanes such as vinyl trichlorosilanes or Werner complexes of chromium, for instance acylatochromic halides such as methacrylato- or stearatochromic chloride.

In the practice of the present invention reinforcing fibers are blended, preferably by dry blending (so-called tumble-blending), with the olefin polymer powder as defined hereinbefore. Preferably, from about 0.1 to about 100 weight parts of reinforcing fiber, especially from about 5 to about 50 weight parts, are tumble blended in a closed container with 100 weight parts of olefin polymer powder. It is understood that reinforcing fibers can be suitably blended with the olefin polymer powder using mixing devices which bring about heat plastification of the olefin polymer such as a hot roll mill, Banbury mixer, extruder, kneading and/or compacting devices and the like. However, it is found that these more severe mixing devices tend to break the fibers into shorter lengths and thus cause a lowering of the resultant strength of the fabricated article. Such breaking of the fiber generally does not occur in tumble blending or other similar preferred dry blending operations.

It is further understood that small amounts of additives such as antioxidants, pigments, dyes, colors, heat stabilizing agents, light stabilizing agents, flow agents, plasticizers, mold release agents and the like may also be incorporated with the polymer or with the dry blend of the polymer, but such additives are not required in the invention. The additives, when used, are usually employed in amounts corresponding to from about 0.5 to about 5 percent by weight of the polymer.

The novel reinforcing fiber-olefin polymer powder blends of this invention are readily fabricated in a single step operation into the desired reinforced, shaped article. Accordingly, the need for reblending or reextrusion steps commonly employed in the art for incorporating fibrous material into olefin polymers is eliminated. Fabrication of such blends can be suitably carried out by directly feeding or charging the fiber-powder blends to any conventional thermoplastic processing equipment such as extrusion molders, rotational molders, compression and injection molding devices, thermoformers and thermoforgers.

For example, the foregoing fiber-powder blends may be formed into pipes, profiles or sheets by extrusion, and into other shaped articles, e.g., automobile dash boards, doors and panels, electrical appliance housings, and similar large moldings by compression or injection molding. Sheets of excellent surface finish have also been prepared by compression molding. Thin sheets of low fiber content, i.e. less than about 10 weight percent based on polymer, can be vacuum-formed. In addition to foregoing large shaped articles, the fiber-powder blends are suitable for the amnufacture of smaller shaped articles, e.g., machine components, where strength, rigidity and dimensional stability are required.

In the fabrication operation, it is found that there is no appreciable segregation of the polymer powder from the reinforcing fibers. Furthermore it is observed that the fiber-powder blends of the present invention are free flowing, e.g., flow freely without additional force through a funnel having an opening of five-sixteenths inch in diameter.

The following examples are given to illustrate the invention and should not be construed as limiting its scope. Unless otherwise indicated, all parts and percentages are by weight.

EXAMPLE 1

Preparation of High Bulk Density Polyethylene Powder

Twenty-four pounds of a 25 weight percent solution of diethyl aluminum chloride in n-hexane is added at a rate of 8 pounds/hour to 36 pounds of a 23.8 weight percent n-hexane solution of titanium tetrachloride in a 10-gallon, jacketed stainless steel reactor having an inside diameter of 12 inches and a length of 2 feet and equipped with a filtering mechanism, four baffles (1 inch × 2 feet) mounted on the inner wall thereof and a single flat blade turbine having eight blades and an outside diameter of 3 inches. Addition of the diethyl aluminum chloride solution is carried out in dry, oxygen-free nitrogen atmosphere at temperature of 35°C and at agitation rate of 300 rpm, whereby a slurry of hexane-insoluble catalyst component is formed. The slurry is filtered under the nitrogen atmosphere using the filtering mechanism of the reactor and washed twice with fresh n-hexane to remove hexane-soluble materials. The washed catalyst component which contains titanium trichloride is redispersed in n-hexane to a 27-millimolar concentration thereof.

Into a 200-gallon, jacketed stainless steel reactor having an inside diameter of 36 inches and length of 4 feet and equipped with two flat blade turbines having six blades per turbine and each turbine having an outside diameter of 17 inches, one baffle and a level-activated dump valve for the intermittent withdrawal of polymer slurry is charged 750 pounds of n-hexane under an atmosphere of dry, oxygen-free nitrogen. The reactor is heated to 88°C, pressurized to 100 psig and $H_2$ is charged into the reactor until pressure of about 150 psig is reached. The 27 millimolar dispersion of washed titanium-containing catalyst component in n-hexane and a 27 millimolar solution of triisobutyl aluminum in n-hexane are fed into the reactor at a rate of 7 pounds/hour of each. Normal hexane is pumped into the reactor at a rate of 400 pounds per hour and the feeding of ethylene into the reactor is begun after 15 pounds of combined titanium-containing component dispersion and triisobutyl aluminum solution have been added to the reactor at a flow rate which is increased as pressure and temperature permit to 134 pounds per hour. The polymerization mixture is agitated at a rate of 140 rpm. During polymerization hydrogen comprises 43 mole percent of the gas phase with the remainder of the gas phase being essentially ethylene with trace amounts of vaporized hexane. Polymer product in the form of a slurry is withdrawn from the reactor and the polymer particles thereof are recovered (by steam distillation and drying in an air slide) in the form of a powder having bulk density of 31.2 lbs/ft$^3$, average particle diameter of 300 micron, surface area of 3 m$^2$/g and an angle of repose* of 27°. The polyethylene has an absolute density of 0.955 and melt index of 4.5 decig/min. Examination of particles of the high bulk density polyethylene powder with an electron scanning micrograph confirms the particles to be generally porous, partially fused agglomerates of much smaller particles, the agglomerates having rough surfaces. Cross sectional views and gravimetric analysis of the particles are made. The results of these views and analysis confirm a free volume of 25–45 volume per cent based on total volume of particles.

*Angle of repose is the angle formed between the plane of a horizontal substrate and the plane tangential to the surface of a conical pile of the powder formed by dropping a 260-gram portion of powder through a funnel having a five-sixteenths inch opening onto the horizontal substrate. A lower value indicates higher flowability of the powder.

Blending of Glass Fibers with High Bulk Density Polyethylene Powder

A 45-part portion of the high bulk density polyethylene powder is dry blended with 5 parts of chopped glass fibers having an average diameter of 10 microns and average length of one-fourth inch by tumbling the ingredients in a drum on a tumble blender. The resulting fiber-powder blend is a dust-free material having an angle of repose of 29° and a 260-g sample flows freely through a funnel having a five-sixteenths inch opening in a period of 87 seconds. The fiber-powder blend is fed into an air conveying means at a rate of 1,600 lbs/hr and is transported in the means for a distance of 120 ft. The conveying means has an elevation of 40 feet, a line size of 2 inches and a blower having a rating of 5 horsepower. Portions of the transported blend are withdrawn at various intervals from the exit end of the air conveying means and analyzed for fiber glass to determine the uniformity of the blend. The results are shown as follows in Table I.

TABLE I

| Interval, minutes | % Fiber Glass (1) |
|---|---|
| 2 | 10.7 |
| 4 | 10.7 |
| 6 | 10.4 |
| 8 | 9.5 |
| 10 | 9.5 |
| 12 | 9.9 |
| 14 | 9.5 |
| 16 | 10.0 |

(1) Blend before entry into the air conveying means has a concentration of fiber glass of 10 percent.

As further evidence of the resistance of the fiber-powder blend to segregation upon agitation, a sample of the blend is placed in a platform shaker and is shaken with a vertical and horizontal motion at 150 oscillations per minute for 36 hours. A portion of the sample is withdrawn from the shaker and upon analysis is found to have a fiber glass content of about 10.2 percent.

For the purpose of comparison, two samples of pellets (1/8 × 1/16inch ) of pre-extruded polyethylene having a density of 0.967 g/cc and melt index of 9.0 decig/min are ground into powders having particle sizes in the ranges of approximately 1,200 microns and 149–358 microns. The samples are dry blended with glass fibers (1/4 inch × 10 microns) in manner described hereinbefore to provide comparative fiber-powder blends containing 10% fiber glass. The comparative blends have angles of repose as follows:

| Blend | Ave. Particle Diameter micron | Angle of Repose |
|---|---|---|
| $A_1$ | ~ 1200 | 40° |
| $A_2$ | 149–358 | 36° |

Portions of the blends are charged separately to a funnel having a five-sixteenths inch opening and require tapping in order to flow through the funnel at rates as follows:

| Blend | Flow Rate, seconds |
|---|---|
| $A_1$ | 206 |
| $A_2$ | 282 |

The same comparative blends are similarly placed in the platform shaker and rotated for 36 hours as described hereinbefore. In each comparative blend, the ingredients almost entirely separated such that analysis of any polymer powder portion for fiber glass indicates no measurable amount of fiber glass is admixed with the powder.

EXAMPLE 2

Samples of the glass powder-blend of Example 1 and the comparative blends described therein are molded separately in an injection molding device to form test tabs (2 inches × 1/2 inch × 0.125 inch) with one-fourth inch notch. Test tabs of the blend of Example 1 have more uniform distribution of glass fibers in the polyethylene and significantly better impact and tensile strengths than tabs molded from the comparative blends.

What is claimed is:

1. A method for incorporating a reinforcing fiber into olefin polymer comprising the steps of blending a reinforcing amount of reinforcing fibers with an extrudable, free flowing olefin polymer powder characterized by a bulk density in the range from about 20 to about 35 pounds per cubic foot and particles having particle sizes predominantly in the range from about 50 to about 800 microns, roughened surfaces and porosity sufficient to provide an average free volume within individual particles in the range from about 20 to about 50 volume per cent based on total volume of particles of the powder.

2. The method according to claim 1 wherein the reinforcing fibers having fiber lengths from about one thirty-second to about 1 inch and diameters from about 5 to about 50 microns and the amount of reinforcing fiber is in the range from about 0.1 to about 100 weight parts of fibers per 100 parts of polymer powder.

3. The method according to claim 2 wherein the reinforcing fibers are glass fibers.

4. The method according to claim 3 wherein the olefin polymer is high density polyethylene.

5. An olefin polymer powder blend comprising an intimate mixture of at least about 50 weight per cent of an extrudable, free flowing olefin polymer powder characterized by a bulk density in the range from about 20 to about 35 pounder per cubic foot and particles having particle sizes predominantly in the range from about 50 to about 800 microns, roughened surfaces and porosity sufficient to provide an average free volume within individual particles in the range from about 20 to about 50 volume per cent based on total volume of the powder and a reinforcing amount of reinforcing fibers.

6. The blend according to claim 5 wherein the particles are partially fused agglomerates.

7. The method according to claim 1 wherein the reinforcing fiber and the olefin polymer powder are blended and then fabricated into a shaped article.

* * * * *